(12) United States Patent (10) Patent No.: US 8,560,219 B2
Weimann (45) Date of Patent: Oct. 15, 2013

(54) METHOD FOR DETECTING A BOUNDARY CROSSING

(75) Inventor: Franz Weimann, St. Johann im Pongau (AT)

(73) Assignee: Kapsch TrafficCom AG, Vienna (AT)

( * ) Notice: Subject to any disclaimer, the term of this patent is extended or adjusted under 35 U.S.C. 154(b) by 39 days.

(21) Appl. No.: 13/412,216

(22) Filed: Mar. 5, 2012

(65) Prior Publication Data

US 2012/0265430 A1 Oct. 18, 2012

(30) Foreign Application Priority Data

Apr. 15, 2011 (EP) .................................. 11450051

(51) Int. Cl.
*G05D 1/02* (2006.01)
(52) U.S. Cl.
USPC ......................................................... 701/300
(58) Field of Classification Search
USPC ................... 701/300–302; 342/450, 453–457
See application file for complete search history.

(56) References Cited

U.S. PATENT DOCUMENTS 5,945,948 A * 8/1999 Buford et al. ................. 342/457

FOREIGN PATENT DOCUMENTS

| DE | 101 55 501 A1 | 5/2003 |
|---|---|---|
| DE | 10 2005 016 814 B4 | 10/2006 |
| EP | 0 742 890 B2 | 11/1996 |
| EP | 1 120 749 A1 | 8/2001 |
| EP | 1 696 208 A1 | 8/2006 |
| EP | 1 701 322 B1 | 9/2006 |
| WO | WO 95/14909 | 6/1995 |
| WO | WO 2004/025574 A1 | 3/2004 |

OTHER PUBLICATIONS

Extended European Search Report for corresponding European Patent Application No. 11450051.5, dated Aug. 31, 2011, 4pp.

* cited by examiner

*Primary Examiner* — Yonel Beaulieu
(74) *Attorney, Agent, or Firm* — Christie, Parker & Hale, LLP

(57) ABSTRACT

Method for detecting a boundary crossing of an object, the movement of which is represented by a sequence of positions on a digital road map ith vectorized road segments and at least one boundary, the method comprising: determining an intersection of the boundary with a road segment and a reference direction in the orientation of this road segment, successively projecting vectors, each determined between one of the positions and the intersection point, onto the reference direction, in order to obtain a sequence of projections, and detecting a boundary crossing if a change of direction or sign occurs in the sequence of projections.

7 Claims, 3 Drawing Sheets

METHOD FOR DETECTING A BOUNDARY CROSSING

CROSS-REFERENCE TO RELATED APPLICATION(S)

This application claims priority to European Patent Application No. 11 450 051.5, filed on Apr. 15, 2011, the contents of which are hereby expressly incorporated by reference.

FIELD OF THE INVENTION

The present invention relates to a method for detecting a boundary crossing of an object having its position represented by a sequence of positions on a digital road map with vectorized road segments and at least one boundary.

BACKGROUND

Detecting a boundary crossing on a digital road map is of crucial importance for electronic toll systems based on global satellite navigation systems (GNSS) such as GPS, GLONASS, Galileo, etc. In such GNSS toll systems, vehicle-based onboard units (OBUs) continuously determine their own positions ("position fixes"), by of satellite navigation systems. Then positions are then compared decentrally in the OBUs or centrally in one or more server computers of the road toll system—to road segments of a digital road map ("map matching") to determine the usage of a road or an area (e.g. city area) by a vehicle, and then to charge a toll. In order to determine the toll correctly, the entry into and exit from an area subject to a toll must be accurately determined. For this purpose, virtual boundaries, so-called "virtual gantries are defined on the digital road map," the crossing of which is to be detected based on the continuously determined positions of a vehicle.

A variety of methods for solving this detection problem are known from the publications EP 1 696 208, EP 1 701 322, WO 95/14909, DE 101 55 501, WO 2004/025574, DE 10 2005 016 814 and EP 0 742 890 and are based on detection of the entry into certain regions ("geofencing"), a check of the sequence of areas traveled through or a continuous determination of the distance from a defined boundary point. All of these known methods have the disadvantage that they require very elaborate calculations and are thus ill-suited for real-time implementations on OBU processors with limited computational power, or due to position determination inaccuracies inherent in the system, they cannot provide reliable information about a boundary crossing if, for example, a driver comes into the vicinity of a boundary but turns around shortly before reaching it.

SUMMARY

The present invention is directed to a method for detecting a boundary crossing of an object on a digital road map that is simpler and more reliable than known methods and supplies more precise information about a boundary crossing.

In some embodiments, the present invention is a method executed by one or more computers for detecting a boundary crossing of an object, the movement of the object represented by a sequence of positions on a digital road map with vectorized road segments and at least one boundary. The method includes: determining an intersection point of the boundary with a road segment and a reference direction in the orientation of said road segment; successively projecting vectors, each vector determined between one of the positions and the intersection point, onto the reference direction to obtain a sequence of projections; and detecting a boundary crossing, when a change of direction or sign occurs in the sequence of projections.

According to some embodiments of the present invention, a boundary crossing can be detected with simple means and recognized reliably. Moreover, detection errors that could occur in case of a turn-around shortly before reaching a boundary are precluded.

The projections of the position vectors onto the reference direction can be determined in various manners. According to some embodiments of the invention, the projecting is performed by forming vectorial inner products of the vectors with the reference direction, and a boundary crossing is recognized by a sign change of the inner products. In some embodiments of the invention, the projecting is performed by transforming the vectors into a local coordinate system with the reference direction as x-axis, and a boundary crossing is recognized by a change of sign of the vectors' x-coordinates. Both variants can be calculated with relatively low computational power and are therefore also suitable for real-time implementations both in decentralized "map matching" OBUs ("thick clients") and in the central "map matching" server computers of a road toll system.

In some embodiments, the boundary crossing is validated, if the absolute values of the two projections before and after the change of direction or sign exceed a predetermined (minimum) value. Accordingly, inaccuracies of position determination can be taken into account and a particularly reliable recognition of the passage of the virtual boundary can be achieved.

In some embodiments, the boundary crossing is validated, if the normal distances of the two positions lying before and after the change of direction or sign from the reference direction do not exceed a predetermined (maximum) value. An incorrect detection can be avoided with this additional check, when driving on parallel streets close to one another.

BRIEF DESCRIPTION OF THE DRAWINGS

The invention is described below in detail with reference to the accompanying drawings in which.

DETAILED DESCRIPTION

Figure 1:
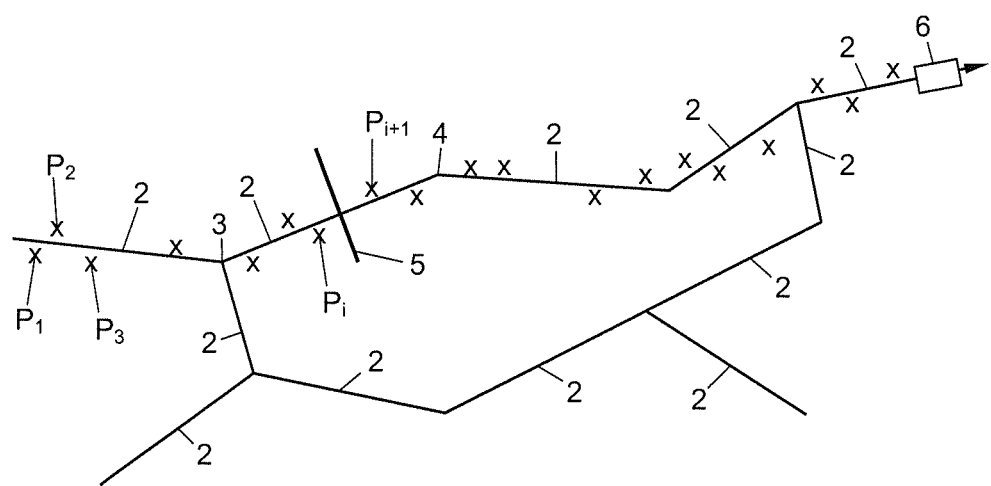
FIG. 1 schematically shows the movement of an object on a digital road map.
Figure 1:
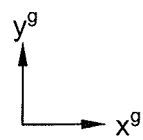

FIG. 1 shows a cutout of a digital road map 1 with a plurality of road segments 2 that form a road network. The road segments 2 are vectorized and each segment is defined by its beginning or ending points 3, 4, in a global coordinate system $x^g/y^g$ of the road map 1, as known in the art.

At least one virtual boundary 5 is intersected by one of the road segments 2. The virtual boundary 5 can also lie at the beginning or endpoint 3, 4 of a road segment 2, i.e., at the connection point of two or more road segments 2. In this exemplary case, the boundary 5 is assigned to one of the road segments 2.

The boundary 5 can be defined as a vectorized path with a beginning point $T_1$ and an end point $T_2$, from which its intersection point $T_0$ with the crossing road segment 2 can be determined. The boundary 5 can also be defined directly as the intersection point $T_0$.

The movement of an object 6, such as a vehicle, that continuously determines position fixes in the global coordinate system $x^g/y^g$ by a GNSS-OBU is represented on the road map 1 by a sequence of positions $P_1, P_2, \ldots$, in general $P_i$. In the example shown in FIG. 1, the vehicle or object 6 follows the road path shown at the top, also including the road segment 2 with the boundary 5. The passage of the boundary 5 by object 6 is determined by evaluating the positions $P_i$ as follows. Each OBU includes one or more processors and related memory.

Figure 2:
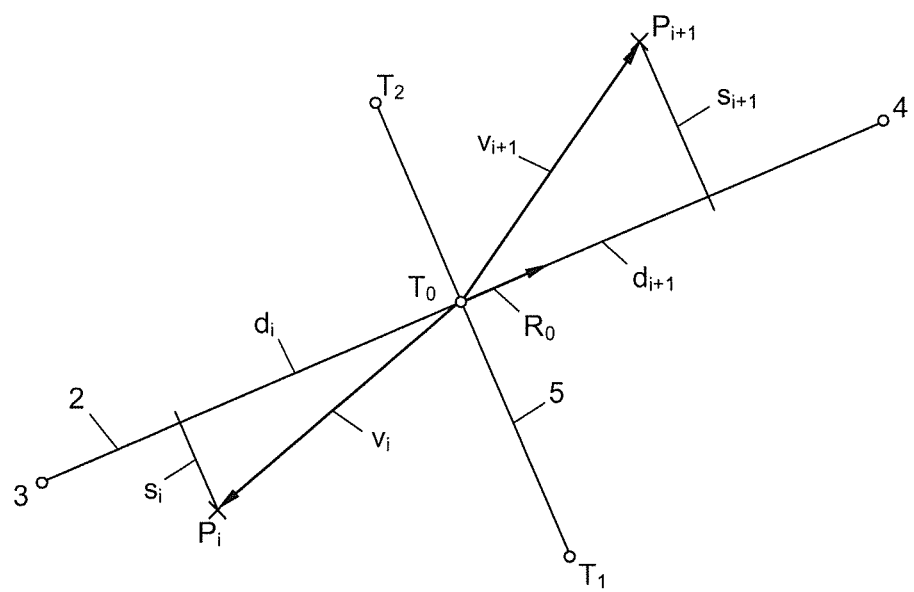
FIG. 2 shows an exemplary embodiment of the method of the invention by forming vectorial inner products.

FIG. 2 shows two exemplary successive positions $P_i$, $P_{i+1}$, that were determined immediately before and after the boundary 5. Due to the inaccuracies of the position determination, e.g., GNSS inaccuracies, the positions $P_i$, $P_{i+1}$ are generally not precisely on the road segment 2, but rather, a normal distance $s_i$ or $s_{i+1}$ away from it.

For each position $P_i$ of the sequence of positions, for example, $P_i$ and $P_{i+1}$, a vector $v_i$ is calculated between this position and the intersection point $T_0$ of the boundary 5 with the road segment 2. The vectors $v_i$ are each projected subsequently onto the road segment 2 or immediately after calculation. More precisely, the vectors are projected onto a reference direction $R_0$ of the road segment 2, so that a sequence of projections $d_i$ is obtained. The reference direction $R_0$ lies in the orientation of the road segment 2, and preferably has a length one (unit vector).

In the embodiments shown in FIG. 2, the projections $d_i$ are formed by taking the vectorial inner product between the vectors $v_i$ and the reference direction $R_0$, that is:

$$d_1 = \overrightarrow{T_0 P_1} \cdot \overrightarrow{R_0} = \overrightarrow{v_1} \cdot \overrightarrow{R_0} \tag{1}$$
$$\vdots$$
$$d_i = \overrightarrow{T_0 P_i} \cdot \overrightarrow{R_0} = \overrightarrow{v_i} \cdot \overrightarrow{R_0} \tag{2}$$
$$d_{i+1} = \overrightarrow{T_0 P_{i+1}} \cdot \overrightarrow{R_0} = \overrightarrow{v_{i+1}} \cdot \overrightarrow{R_0} \tag{3}$$
$$\vdots$$

When a change of sign (change of direction) in the sequence of projections (inner products) $d_i$ occurs, then the boundary 5 has been crossed and a boundary crossing is detected.

The invention may also optionally check whether the absolute values of the two projections $d_i$, $d_{i+1}$ before and after the change of direction or sign exceed a predetermined minimum value, min, i.e., $|d_i|>\text{min}$ and $|d_{i+1}|>\text{min}$. If yes, the previously detected boundary crossing is accepted (validated). Consequently, incorrect detections due to positioning inaccuracies can be prevented.

The normal distances $s_i$ of the positions $P_i$ from the road segment 2 can also be evaluated as an additional validation step. For this purpose, the method of the present invention checks whether the two normal distances $s_i$, $s_{i+1}$ before and after the previously detected change of direction or sign are less than predetermined maximum values, $\text{max}_1$, $\text{max}_2$, $\text{max}_3$, i.e. $|s_i|<\text{max}_1$ and $|s_{i+1}|<\text{max}_2$, where the maximum values $\text{max}_1$ and $\text{max}_2$ can also be equal, and/or $|s_i-s_{i+1}|<\text{max}_3$. With this check, incorrect detections due to, for example, driving on closely parallel road segments 2 that have no boundaries 5 can be precluded.

Figure 3:
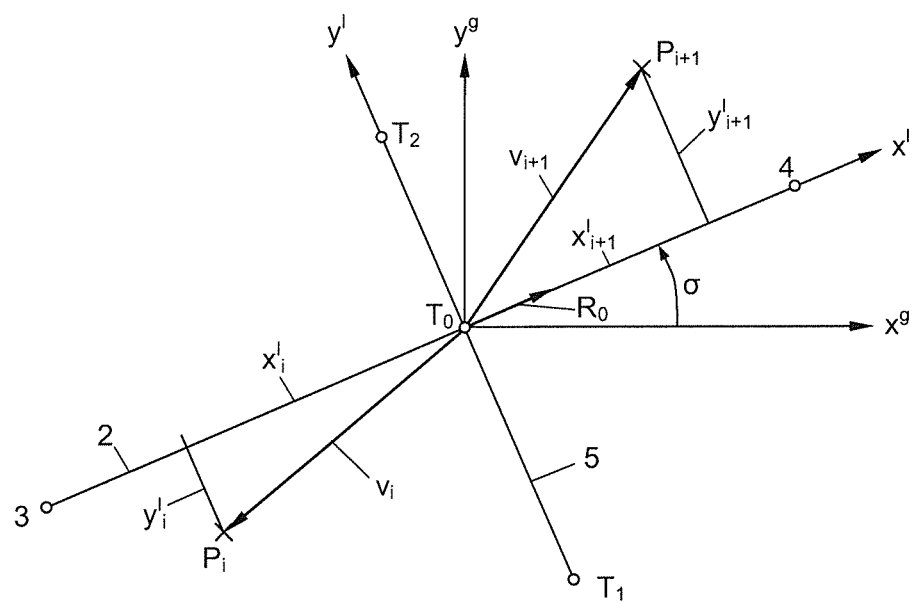
FIG. 3 shows an exemplary embodiment of the method of the invention by coordinate transformation.

FIG. 3 shows an embodiment for calculating the projections $d_i$ of the vectors $v_i$. A local coordinate system $x^l/y^l$ is set up from the reference direction $R_0$ in this case, with the reference direction $R_0$ as the x-axis $x^l$. The vectors $v_i$ calculated in the global coordinate system $x^g/y^g$ are transformed into the local coordinate system $x^l/y^l$ by applying the rotation matrix:

$$R = \begin{bmatrix} \cos\sigma & -\sin\sigma \\ \sin\sigma & \cos\sigma \end{bmatrix} \tag{4}$$

with $\sigma$ being the angle between $x^l$ and $x^g$.

The vectors $v^l_i$ transformed into the local coordinate system $x^l/y^l$ are thus can be represented as:

$$\overrightarrow{v^l_i} = R^{-1} \overrightarrow{v_i} = \begin{bmatrix} x^l_i \\ y^l_i \end{bmatrix} \tag{5}$$

$$\overrightarrow{v^l_{i+1}} = R^{-1} \overrightarrow{v_{i+1}} = \begin{bmatrix} x^l_{i+1} \\ y^l_{i+1} \end{bmatrix} \tag{6}$$

The x-coordinates $x^l_i$ and $x^l_{i+1}$ of the transformed vectors $v^l_i$, $v^l_{i+1}$ in turn correspond to the projections $d_i$ and $d_{i+1}$. A change of sign, as appears between the projections $x^l_i = d_i$ and $x^l_{i+1} = d_{i+1}$, again indicates the boundary crossing.

Here too, the projections $x^l_i$, $x^l_{i+1}$ can be easily checked in the manner mentioned above, i.e. as to whether $$|x^l_i|>\text{min and } |x^l_{i+1}|>\text{min}. \tag{7}$$

Here too, the projections $x^l_i$, $x^l_{i+1}$ can be easily checked in the manner mentioned above, i.e. as to whether $$|x^l_i|>\text{min and } |x^l_{i+1}|>\text{min}. \tag{7}$$

In addition to the described evaluation of the positions $P_i$, additional measured values of position determination such as the orientation, speeds, pseudo-ranges, etc. from a GNSS position determination can be used for detecting the crossing of the boundary 5.

The illustrated method for detecting the passage of virtual boundaries 5 can be executed both decentrally in an OBU (having one or more processors) and centrally in a toll calculation computer server(s) of a road toll system.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method executed by one or more computers for detecting a boundary crossing of an object, the movement of the object represented by a sequence of positions on a digital road map with vectorized road segments and at least one boundary, the method comprising:
   determining an intersection point of the boundary with a road segment and a reference direction in the orientation of said road segment;
   successively projecting vectors onto the reference direction to obtain a sequence of projections, wherein each vector is determined between one of the positions and the intersection point; and
   detecting a boundary crossing, when a change of direction or sign occurs in the sequence of projections.

2. The method according to claim 1, wherein said successively projecting vectors comprises forming vectorial inner products of the vectors with the reference direction, and said detecting a boundary crossing comprises detecting a boundary crossing by a change of sign of the inner products.

3. The method according to claim 1, wherein said successively projecting vectors comprises transforming the vectors into a local coordinate system with the reference direction as x-axis, and said detecting a boundary crossing comprises detecting a boundary crossing by a change of sign of x-coordinates of the vectors.

4. The method according to claim 1, further comprising validating the boundary crossing, when the absolute values of the two projections lying before and after the change of direction or sign exceed a predetermined minimum value.

5. The method according to claim 2 or 3, further comprising validating the boundary crossing, when the absolute values of the two projections lying before and after the change of direction or sign exceed a predetermined minimum value.

6. The method according claim 1, further comprising validating the boundary crossing, when normal distances of two positions lying before and after a change of direction or sign from the reference direction do not exceed a predetermined maximum value.

7. The method according claim 2 or 3, further comprising validating the boundary crossing, when normal distances of two positions lying before and after a change of direction or sign from the reference direction do not exceed a predetermined maximum value.

\* \* \* \* \*

UNITED STATES PATENT AND TRADEMARK OFFICE
CERTIFICATE OF CORRECTION

PATENT NO. : 8,560,219 B2  Page 1 of 1
APPLICATION NO. : 13/412216
DATED : October 15, 2013
INVENTOR(S) : Franz Weimann It is certified that error appears in the above-identified patent and that said Letters Patent is hereby corrected as shown below:

In the Specification

Column 4, lines 30-33

Delete "Here too, the projections $x^1_i$, $x^1_{i+1}$ can be easily checked in the manner mentioned above, i.e. as to whether $|x^1_i| >$ min and $|x^1_{i+1}| >$ min. (7)",
Insert -- The y-coordinates $y^1_i$ and $y^1_{i+1}$ of the transformed vectors $v^1_i$, $v^1_{i+1}$ correspond to the normal distances $s_i$, $s_{i+1}$ and can again be checked for satisfaction of the maximum boundaries $max_1$, $max_2$, $max_3$, i.e. as to whether $|y^1_i| < max_1$ and $|y^1_{i+1}| < max_2$ and/or $|y^1_i - y^1_{i+1}| < max_3$. --

Signed and Sealed this
Thirteenth Day of May, 2014

Michelle K. Lee
*Deputy Director of the United States Patent and Trademark Office*